United States Patent [19]

Ferry et al.

[11] Patent Number: 5,582,790

[45] Date of Patent: Dec. 10, 1996

[54] INDUCTOR FOR INDUCTION HEATING OF METAL STRIPS

[75] Inventors: Georges C. Ferry, Avon; Jean-Louis B. Peureux, Villethierry; Philippe Roehr, Soultz; Jean Delassus, Montmorency, all of France

[73] Assignee: Electricite de France—Service National, Paris, France

[21] Appl. No.: 211,736

[22] PCT Filed: Oct. 14, 1992

[86] PCT No.: PCT/FR92/00970

§ 371 Date: Mar. 31, 1995

§ 102(e) Date: Mar. 31, 1995

[87] PCT Pub. No.: WO93/08669

PCT Pub. Date: Apr. 29, 1993

[30] Foreign Application Priority Data

Oct. 14, 1991 [FR] France .................................. 91 12627

[51] Int. Cl.⁶ ..................................................... C21D 9/62
[52] U.S. Cl. ........................................... 266/104; 266/103
[58] Field of Search .................................... 266/102, 103, 266/104; 219/618, 670, 672

[56] References Cited

U.S. PATENT DOCUMENTS

| | | | |
|---|---|---|---|
| 2,583,227 | 1/1952 | Neidigh | 219/10.75 |
| 3,489,875 | 1/1970 | Ross | 219/10.69 |
| 3,649,804 | 3/1972 | Kasper | 219/10.75 |
| 4,145,591 | 3/1979 | Takeda | 219/10.49 R |

FOREIGN PATENT DOCUMENTS

| | | |
|---|---|---|
| 0194708 | 9/1986 | European Pat. Off. . |
| 1193496 | 11/1959 | France . |
| 2814927 | 7/1987 | United Kingdom . |

OTHER PUBLICATIONS

Patent Abstracts of Japan, vol. 15, No. 76, Feb. 21, 1991 & JP-A-2,301,522 Mitsubishi Heavy Ind., Ltd., Dec. 13, 1990.

*Primary Examiner*—Scott Kastler
*Attorney, Agent, or Firm*—Sughrue, Mion, Zinn, Macpeak & Seas

[57] ABSTRACT

An induction heating device for continuously moving metal strip (22) for heat treatment or coating purposes comprises a flattened, spirally wound coil having the turns interlinked by an oblique connection on a small side of the coil, and surrounding the continuously moving metal strip (22). Means (24–26) are provided for suppressing the transverse component of the magnetic field created by the said coil.

8 Claims, 6 Drawing Sheets

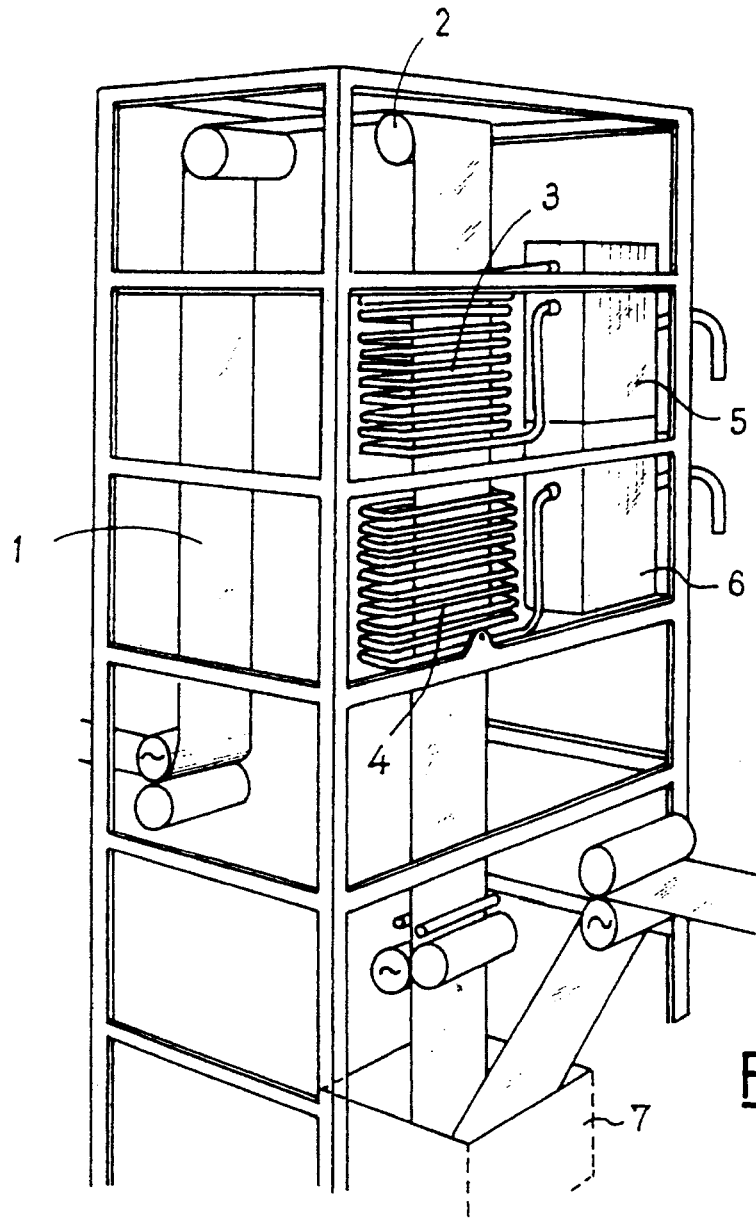
FIG·1
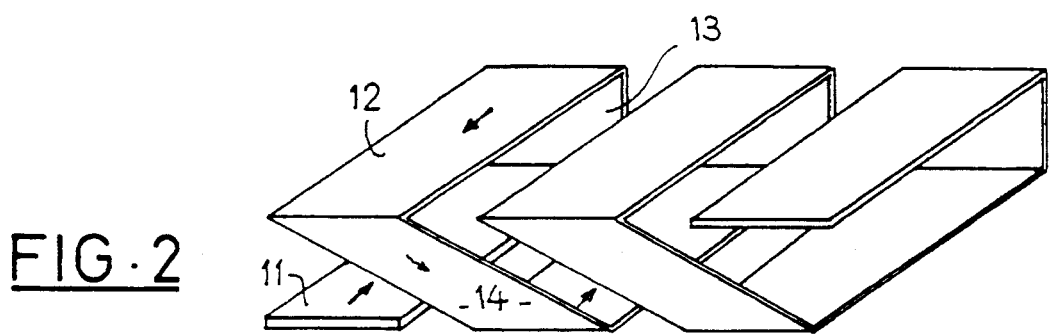
FIG·2

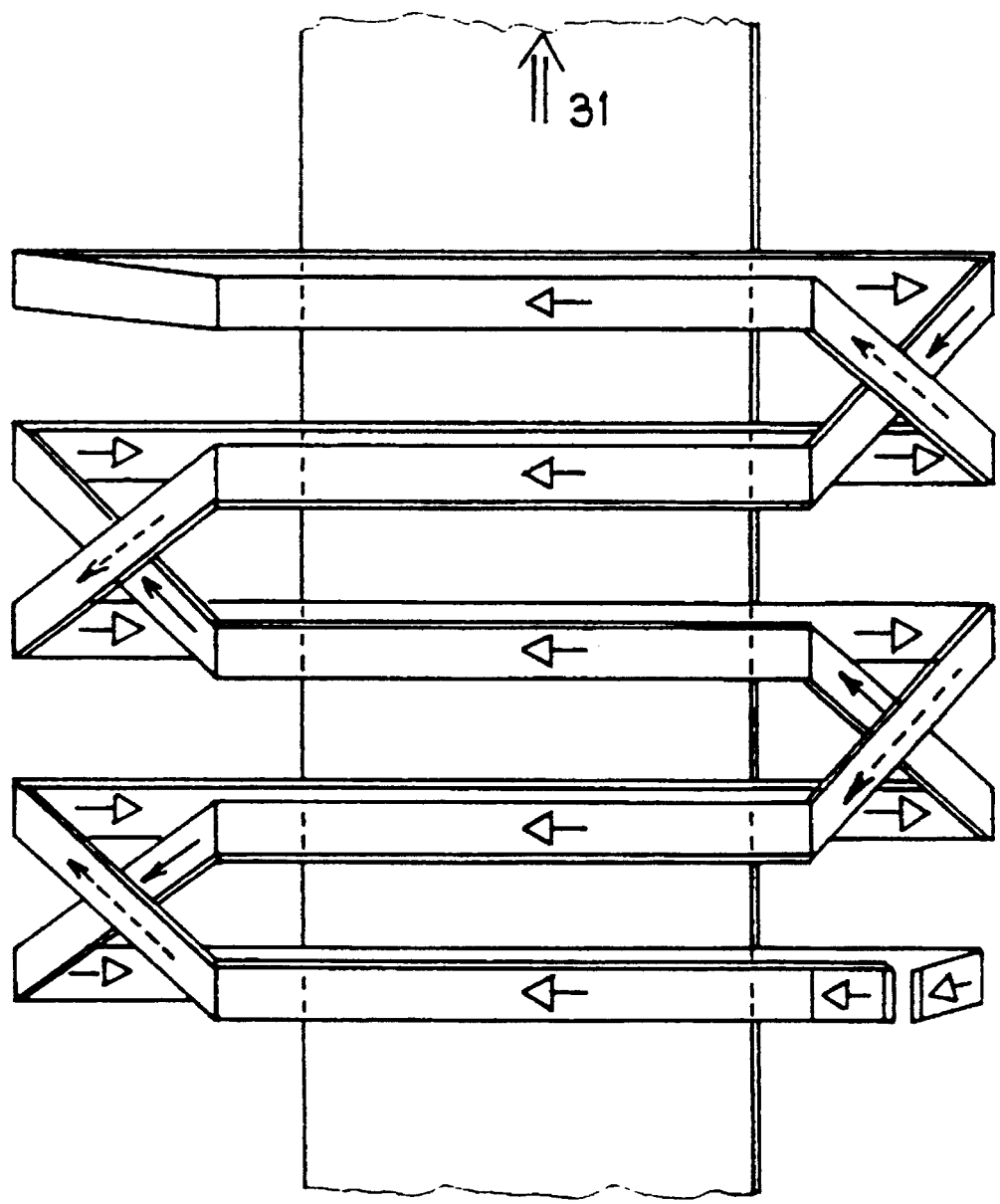
FIG·6

INDUCTOR FOR INDUCTION HEATING OF METAL STRIPS

BACKGROUND OF THE INVENTION

The present invention relates to treatments by a device for induction heating of continuously moving metal strips for heat-treatment or coating-treatment purposes; the coating may be metallic (reflow of tin or zinc) or organic (stoving of enamel or baking of paint). Induction heating, because of its intrinsic qualities (cleanliness, rapidity, flexiblity) is a technique particularly well suited to the continuous treatment of metal strips. This is why induction heating is employed for the treatment of the coating, either metallic or organic coating, of metal strips, in particular steel strips.

In the case of the heating of magnetic steels, in particular, the inductors employed generate mainly a longitudinal magnetic field parallel to the direction of continuous movement of the metal strip. The operating frequency of the inductors depends on the electrical, magnetic and geometrical characteristics of the metal strip, as well as on the power density for magnetic materials. The inductors are constituted by a coil in the form of a flattened helix of several turns, supplied by a frequency converter.

Such an induction coil generates a magnetic field which includes a significant longitudinal component, but unfortunately it also creates a transverse component. The first, longitudinal component generates induced currents which flow in the thickness of the strip perpendicularly to the direction of continuous movement and which heat it. The transverse component generates so-called leakage currents which originate in the strip, initially travel along it in the direction of continuous movement of the strip and which seek to return to the point of departure, following all the pathways (roller, metal casing, etc.) possible.

If an insulator, for example a layer of paint or of enamel, is interposed in the path of these leakage currents, a voltage then appears, the level of which may cause the destruction of this insulator. This phenomenon, known by the name of the spark-erosion phenomenon, is particularly detrimental to the quality of the paints or enamels which are deposited on the metal strip.

As regards conductive coatings, that is to say metal coatings, there is no deterioration in the quality since the currents may flow freely; by contrast, they may damage certain components, such as the bearings of the rollers for guiding the strip, for example. As regards organic coatings, a highly insulated guiding system (roller mounted on a block or coated with a plastic) may be used.

For multipurpose treatment installations, the use of metal rollers is essential. In this latter case, it is possible to place collectors on the edges of the strip, upstream and downstream of the inductor, so as to localize the defects. Unfortunately, this system leads to the manufacture of a strip of lower quality since these edges are bared and this is not a highly reliable system since there is the risk of "solid skin" paint breakdowns.

The origin of the leakage currents is the tranverse component of the magnetic field created by the inductor. The latter has, in cross-section, the shape of an elongate rectangle surrounding the metal strip to be treated and includes straight turns which are joined together by an oblique connection arranged on the side of the turn.

It is desirable to eliminate the leakage currents in order to improve the performance characteristics of the coating-treatment installations and, in particular, to be able to use multi-purpose installations. This is why the present invention proposes to provide an inductor for induction heating continuously moving metal strips, which enables the undesirable leakage currents to be eliminated.

SUMMARY OF THE INVENTION

For this purpose, the subject of the present invention is an inductor for induction heating of continuously moving metal strips for coating-treatment purposes, constituted by a coil in the form of a flattened helix, comprising turns connected together by an oblique connection arranged on a short side of the coil and surrounding the continuously moving metal strip, characterized in that means are provided for suppressing the transverse component of the magnetic field created by the said coil.

Because the invention enables the transverse component of the magnetic field to be suppressed, the leakage currents disappear and the aforementioned draw-backs are no longer produced.

According to a first embodiment, the inductor includes a ring constituting a short-circuited turn surrounding the short side of the coil, including the oblique connections between turns.

This arrangement enables the effects created by the transverse component of the magnetic field to be cancelled out.

According to another embodiment of the invention, the coil is constituted by turns forming an interleaved double helix.

By virtue of this arrangement, the effects created by each of the oblique connections are eliminated in pairs.

According to yet another embodiment of the invention, the coil is made up of two symmetrical coils having opposite directions of winding.

Here too, the deleterious effects of the oblique connections are compensated for in pairs.

Other characteristics and advantages of the invention will emerge from the description which follows of exemplary embodiments of the invention, the description being given with reference to the appended drawings in which:

BRIEF DESCRIPTION OF THE DRAWINGS

FIG. 1 is a diagrammatic perspective view of an installation for the coating-treatment of metal strips, using induction heating;

FIG. 2 shows an induction coil of conventional type;

FIG. 6 illustrates a second embodiment of the invention;

DESCRIPTION OF PREFERRED EMBODIMENTS

Figure 5:
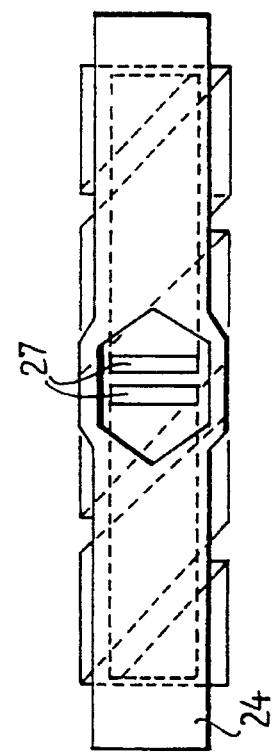
FIGS. 3, 4 and 5 illustrate a first embodiment of the invention.

FIG. 1 represents diagrammatically, in perspective, an installation for the coating-treatment of a continuously moving metal strip, which uses an induction heating device. The metal strip 1 penetrates into the installation from the right-hand side and is conveyed as far as a guide roller 2 which may also constitute a cooling roller. Next, it passes through an induction heating assembly which, in the example represented, includes two successive induction coils 3 and 4 which are each supplied by a frequency converter, respectively 5 and 6. The heated strip next passes into a treatment device shown diagrammatically by a bath 7.

FIG. 2 represents, in perspective, one of the induction coils. It is made up of a metal strip which is wound so as to produce a flattened helix. In the example shown, the coil includes three turns which are supplied with high-frequency current from the left-hand side, the current leaving from the right-hand side, the flow of the current being symbolized by small arrows.

It is seen that each turn includes two long sides 11 and 12 and a perpendicular short side 13; the adjacent turns are joined together by an oblique connection 14. It is the set of these oblique connections 14 which generates the transverse component of the magnetic field.

Figure 3:
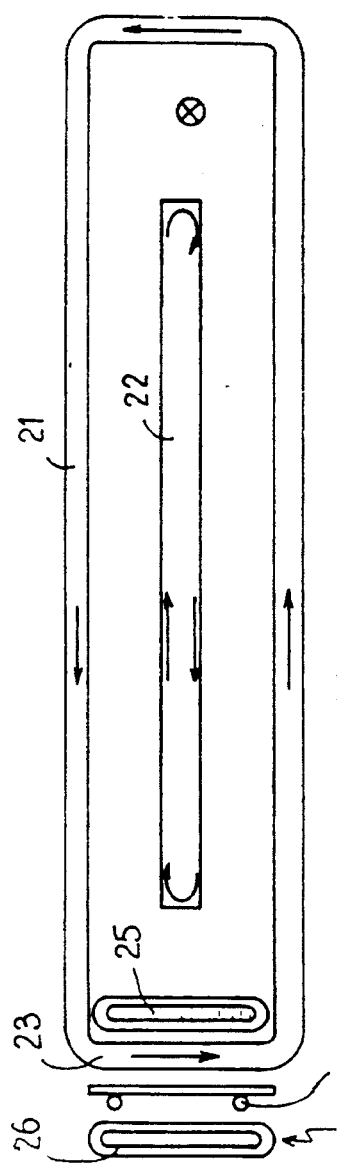
Figure 4:
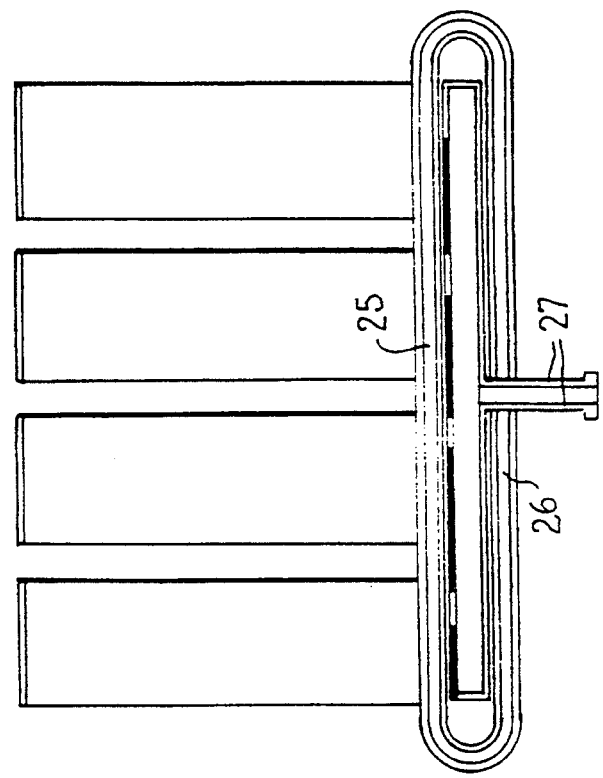

The invention proposes to cancel out this transverse component. A first embodiment of the invention is illustrated by FIGS. 3 to 5. FIG. 3 represents, in front section, an inductor 21 of the type which has just been described, which surrounds the metal strip 22. In FIG. 4, which is a section from above, and in FIG. 5, which is an end-on view, it is seen that this inductor 21 includes four turns.

In accordance with the present invention, the short side 23 of the inductor 21, which includes the oblique connections between turns, is surrounded by a ring 24 which constitutes a short-circuit turn and which has an internal branch 25 located inside the inductor and an external branch 26. This short-circuit turn may, for example, be produced by means of a tube of rectangular cross-section, the thickness of which is greater than the skin depth at the frequency used for the treatment. This turn 24 has a height such that it occupies the entire height of the inductor 21.

The face of this short-circuit turn, which is placed facing the turns of the inductor, in the region of the side where the connections between turns lies, is the site for induced currents of direction opposite to the current of the inductor. The induced currents come together on the face facing the strip to be heated. The internal branch 25 does not constitute a screen for the magnetic field; it regenerates the longitudinal component of the magnetic field completely. The loop, constituted by the internal branch 25 and the external branch 26 and by the set of connection bars 27 of the coil of the inductor, will consume and cancel out, in the vicinity of the metal strip 22, the transverse component of the magnetic field. In fact, the loop, on the face facing the turns and the connections, will be the site of an induced current in opposition with respect to the deleterious component of the current. The strength of the current flowing in this loop is a function of the mutual inductance between it and the set of turns and of connections. The intensity may be adjusted by varying the geometry of the loop (distance between it and the set of connections and of turns); this adjustment may be obtained by possibly using a magnetic circuit in order to increase the coupling. It is thus possible to obtain a state in which the transverse component of the field in the region of the strip 22 is zero. If this turns out to be necessary, the short-circuit turn 24 will be cooled, for example by water.

FIG. 6 represents another embodiment of the invention. In this case, the metal strip 31 moves in an inductor constituted by an interleaved double helix. The two helices include turns joined by oblique connections and the second helix is wound in the reverse direction to that of the first in such a way that the output terminal of the second helix lies in the region of the input terminal of the first.

It is seen that the oblique connections of the first helix cross over the oblique connections of the second helix in such a way that the transverse component of the magnetic field is cancelled out.

In fact, it is possible to consider that each turn is constituted by a length of the first helix and a length of the second helix. Taking into account the symmetries necessary in this arrangement, the number of turns is equal to $4n+1$, n being an integer. If a slight asymmetry is tolerated, it is possible to depart from the $4n+1$ condition; however, it will be necessary for the number of turns to be large (for example greater than 7).

Figure 7:
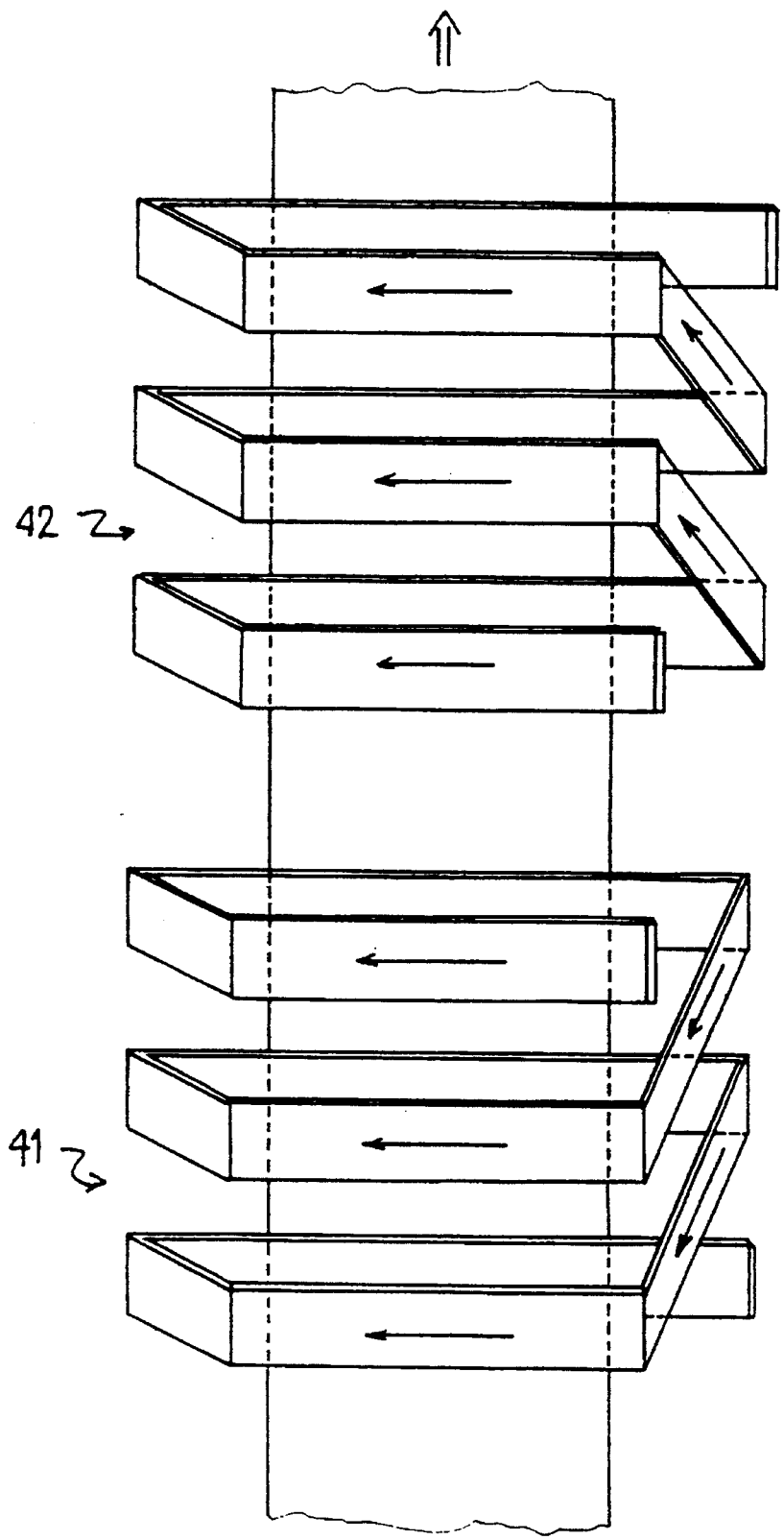
FIG. 7 illustrates a third embodiment of the invention, using two coils having opposite winding directions.

FIG. 7 represents a third embodiment of the invention, in which two coils arranged one after the other are used. A first coil 41 is wound in a first direction and the second coil 42 is wound in the reverse direction. These two coils may be connected in series or in parallel.

Figure 8:
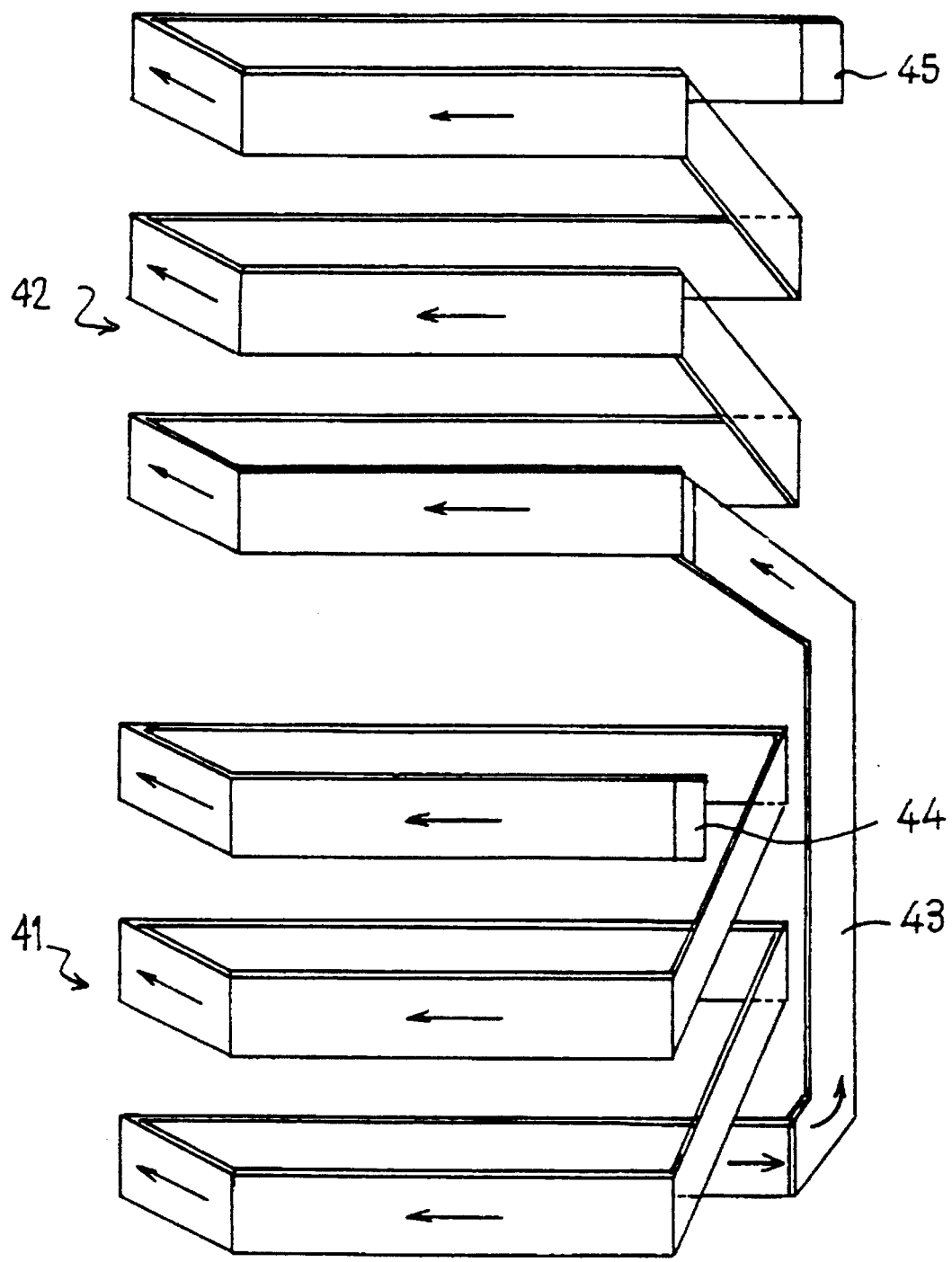
FIG. 8 represents a first way of connecting the coils of FIG. 7.

FIG. 8 represents the series mounting of the two coils 41 and 42 of FIG. 7. The connection 43 produced is made so that the inducing currents of each coil rotate in the same direction and therefore generate longitudinal fields in the same direction. The terminals 44 and 45 are joined respectively to the poles of a source of alternating current.

From the electrical standpoint, the inductor of FIG. 8 is equivalent to an inductor of conventional type which includes twice the number of turns of each elementary coil 41 or 42.

Figure 9:
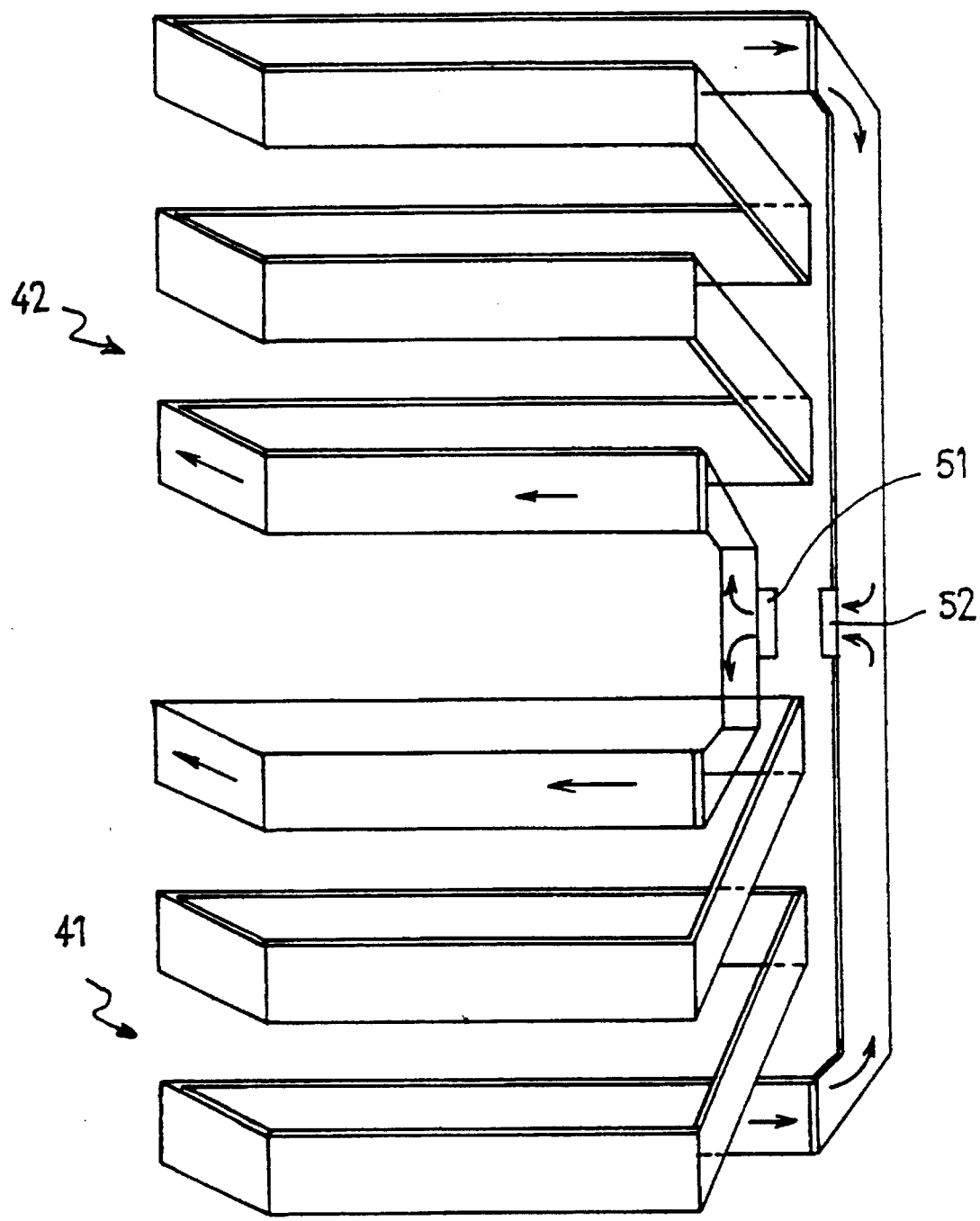
FIG. 9 represents a second way of connecting the coils of FIG. 7.

FIG. 9 represents a parallel connection of the two coils of FIG. 7. In this case, the middle parts and the end parts of the coils are interconnected, the supply terminals 51 and 52 being connected to the alternating-current supply.

The current supplied by the continuous supply source is divided into two currents, each travelling along one of the two coils. In order to have maximum efficiency, it is advantageous to balance the fields created by each of the coils in terms of both phase and amplitude. In the case of coils produced by means of conductive strips, the equality of the fields created by the two coils is relatively easy to obtain. If necessary, in the case where the currents of the two coils are markedly different, it is possible to act on the structure of a coil by varying the number of turns or the length of them.

According to another variant, it is possible to use current-correcting devices, for example impedances, in each coil 41 and 42.

It is seen that the invention makes it possible to suppress the deleterious effects of the transverse-field component of a heating inductor of known type. The various embodiments of the invention are easy to produce and they make it possible to obtain an induction heating inductor which can be used for any type of coating treatment, namely metal or organic coating treatment.

What is claimed is:

1. A longitudinally extending inductor (3,4), for induction heating of continuously longitudinally moving metal strips (1,22,31) for heat-treatment or coating-treatment purposes, constituted by a coil in the form of a flattened helix, said coil comprising: a plurality of turns (11–13) connected together by oblique connections (14) arranged on a short side of the coil and surrounding each continuously moving metal strip (1,22,31); and means (24–26) for suppressing a transverse component of the magnetic field created by said coil.

2. Inductor for induction heating of continuously moving metal strips according to claim 1, wherein said means includes a ring (24) constituting a short-circuited turn surrounding the short side (23) of the coil (21), including the oblique connections between turns.

3. Inductor for induction heating of continuously moving metal strips according to claim 2, wherein the said ring (24) extends over substantially the entire height of the coil (21).

4. Inductor for induction heating of continuously moving metal strips according to claim 2, wherein the ring (24) is constituted by a tube, the thickness of which is greater than a skin depth for the frequency of the induction current.

5. Inductor for induction heating of continuously moving metal strips according to claim 2, 3, 4, or 7, wherein said ring (24) surrounds connection bars (27) of the coil.

6. Inductor for induction heating of continuously moving metal strips according to claim 1, wherein the coil is constituted by turns forming an interleaved double helix.

7. Inductor for induction heating of continuously moving metal strips according to claim 3, wherein the ring (24) is constituted by a tube, the thickness of which is greater than a skin depth for the frequency of the induction current.

8. The inductor according to claim 1, wherein said coil has in cross-section the shape of an elongated rectangle which surrounds the metal strip.

* * * * *